Oct. 22, 1957     W. A. DOCKHORN     2,810,318
STEREOSCOPIC APPARATUS

Filed Aug. 17, 1953     2 Sheets-Sheet 1

INVENTOR.
WAYNE A. DOCKHORN
BY John Ewbank
ATTORNEY

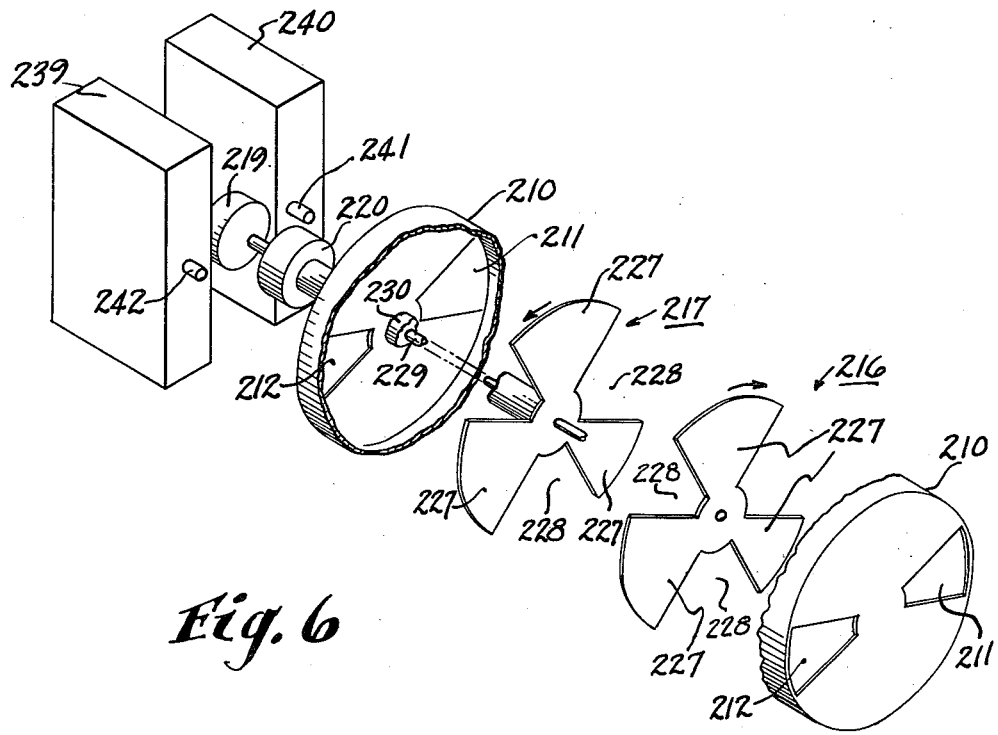

United States Patent Office 2,810,318
Patented Oct. 22, 1957

2,810,318

STEREOSCOPIC APPARATUS

Wayne A. Dockhorn, Huntingdon Valley, Pa.

Application August 17, 1953, Serial No. 374,777

1 Claim. (Cl. 88—16.6)

This invention relates to stereoscopic apparatus having rotating shutter mechanism for dual light apertures.

One of the most widely known methods of projecting three dimensional movies has employed polarized light and viewing devices utilizing polarized filters. However, many spectators have been dissatisfied with their feeling of eyestrain after observing movies through polarized filters. It is an object of the present invention to provide an apparatus achieving a three dimensional effect with a minimum tiring of the eyes.

Heretofore, there have been also stereoscopic viewers which could be employed without the need for polarized light. By the use of such viewers the spectator would see a series of right eye view pictures and a series of left eye view pictures in such a manner as to impart a three dimensional effect. Some stereoscopic viewers have employed rotating disc shutters whereby light was transmitted through two light apertures (the window for the right eye and the window for the left eye) in accordance with some predetermined cycle.

Some of the previously available stereoscopic viewers employing rotating disc shutters have permitted both eyes to view simultaneously an illuminated screen during a portion of the operating cycle. Such simultaneous viewing of an illuminated screen has been objectionable in three dimensional movies. The operating cycle of some of the previously available stereoscopic viewers has provided for a significant period during which both of the light apertures were closed.

By providing short periods during which neither of the dual projectors illuminated the screen, that is by providing a blackout of the auditorium during the time when the viewers permitted dual transparency such viewers have been useful.

However, viewers permitting dual transparency are not appropriate for stereoscopic television, in which long blackouts are not feasible. Three dimensional television is most effective when seen thru a viewer providing precisely alternate openings of the right and left eye windows, that is, providing substantially zero dual transparency and substantially zero dual opacity.

The triple goal of minimized dual transparency, minimized dual opacity, and effective alternate transparency has been recognized heretofore in connection with cumbersome and/or complicated devices.

It is an object of the present invention to provide in equipment having adjacent light apertures, a greatly simplified apparatus in which there is substantially no dual transparency, in which there is a minimized period of dual opacity, and in which there is effective alternate transparency.

The apparatus of the present invention is suitable for use, not only as a stereoscopic viewer for watching three dimensional television, but also for other purposes in which alternate openings of adjacent light apertures are desired. Thus the shutter apparatus of the present invention can be used as an attachment for dual projectors in showing three dimensional movies and/or still views, as an attachment for dual cameras in taking three dimensional motion or television pictures or viewing of three dimensional X-ray pictures, as a viewer for stereoscopic motion pictures, and as an observation window in an airplane to enhance the three dimensional effect in viewing distant objects.

Heretofore, the light apertures have constituted only a relatively small portion of the cross-sectional area of the viewers, thereby necessitating cumbersome viewers and/or a limited field of vision. It is an object of the present invention to provide a motor driven disc shutter apparatus having adjacent light apertures constituting a relatively large portion of the area of the apparatus in the plane perpendicular to the light paths through said apertures. The provision of a wide field of vision is a particularly important feature of certain embodiments of the invention, eliminating the tiring effect of looking through vision-constraining windows as required in previous rotating disc viewers.

According to the present invention oppositely rotating discs are positioned with their axes in the bisecting plane between the two light apertures, whereby both dual transparency and dual opacity are minimized, whereby a shutter means alternately obscures the two apertures and whereby large light apertures, permitting a wide field of vision, are provided by a small compact apparatus free from the cumbersome and complex mechanisms of some of the stereoscopic viewers heretofore available.

Heretofore, stereoscopic viewers having rotating shutters have been sufficiently heavy, cumbersome, and awkward that they have been supported by flexible shafts extending from the theatre seats, or have been designed to be held by hand, or the like. A rotating disc viewer of the present invention can be so light and compact that it can be conveniently worn on the head of the spectator, as explained more completely in co-pending application Serial No. 374,776, filed August 17, 1953, by the same inventor.

In certain embodiments of the invention, a transparent macromolecular organic structural guard is provided about the periphery of the path of the rotating shutter. That portion of the housing forwardly of the eyes is desirably constructed of transparent material, without any vision-constraining mask, in certain embodiments of the invention having subject matter in common with application Serial No. 374,778, filed August 17, 1953, by the same inventor.

In the drawings,

Figure 6 is an exploded view of still another form of the invention.

Figure 1:
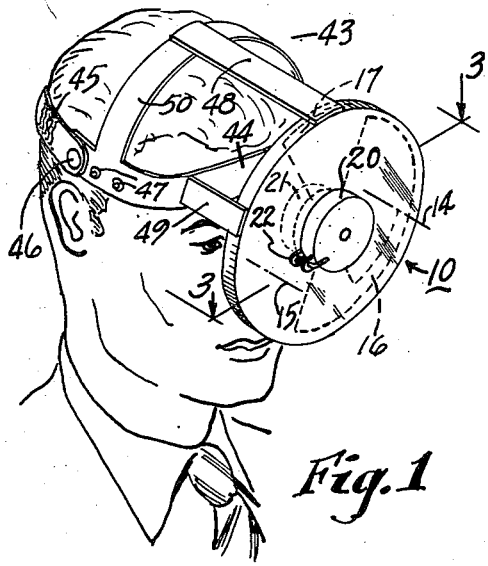
Figure 1 is a perspective view of a preferred embodiment of the invention.
Figure 3:
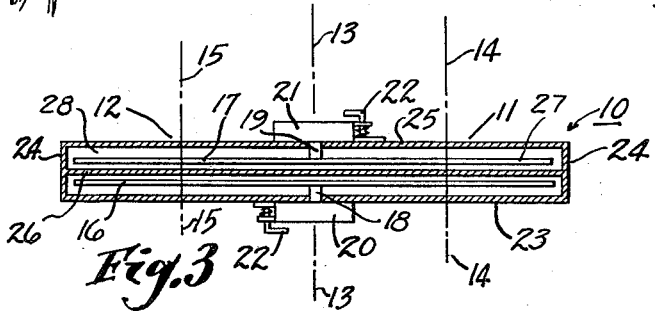
Figure 3 is a sectional view of a portion of the apparatus of Figure 1.

Referring in detail to the drawings and particularly to Figures 1 and 3, there is shown a housing 10 which has two light apertures 11 and 12 for the left and right eyes respectively. A bisecting plane 13 is between the center paths 14 and 15 thru the left and right eye light apertures respectively. Two oppositely rotating discs 16 and 17 are mounted on aligned axles 18 and 19 of the forward motor 20 and rear motor 21 respectively. Both motors are rotatably mounted on the housing 10. The axles 18 and 19 are in the bisecting plane 13.

The housing 10 is desirably constructed of a transparent macromolecular organic structural material and this plastic is desirably formed in sections having sufficient structural strength to support the centrally positioned front and rear motors 20 and 21 in such a manner that they may be rotatably adjusted. A locking device 22 securely maintains the motor at its adjustment until it is manually readjusted. The locking device may include a spring urging a brake pad against the housing, but releasable therefrom by actuation of a finger. When used as a viewing apparatus to observe movies projected from dual projectors having a similar alternate shutter apparatus, the division line between the alternate views can be brought into the bisecting plane between the eyes by adjustment of the motors by rotating the motors on the housing to appropriate positions while both motors rotate the discs synchronously with the corresponding discs of the dual projectors.

The housing 10 includes a forward face 23, cylindrical portions 24 and rear face 25. It is frequently desirable to utilize a transparent plastic partition 26 between the zones for the respective discs, whereby air friction losses are somewhat reduced. The discs 16 and 17 each have semicircular opaque sections 27 and tranparent sections 28, and may be constructed of plastic partially pigmented to provide opaque sections. By using such transparent macromolecular organic structural material for the discs 16 and 17, the electric motors 20 and 21 require only a small amount of power.

In showing three dimensional movies, it is advantageous to employ cooperating stereoscopic apparatus for the spectators and dual projectors. The alternating current operates the synchronous motors of all of the stereoscopic devices at the same speed. The weight of the spectator's viewer is desirably carried by the spectator's head and movable therewith. The windows 11 and 12 and related shutter means are positioned forwardly of the eyes of the spectator.

A headpiece 43 includes a forehead member 44 and a rear member 45 may be an elastic strip having a snap fastener 46 disengageably connected with one of a plurality of cooperating fastening members 47 to provide a further degree of adjustability for fitting the apparatus on heads of various sizes. The housing 10 can be attached to the head piece by suitable connecting means such as the bracket 48 and stabilizing braces 49. The headpiece may include a crown strap 50, to which the bracket 48 is secured.

Figure 2:
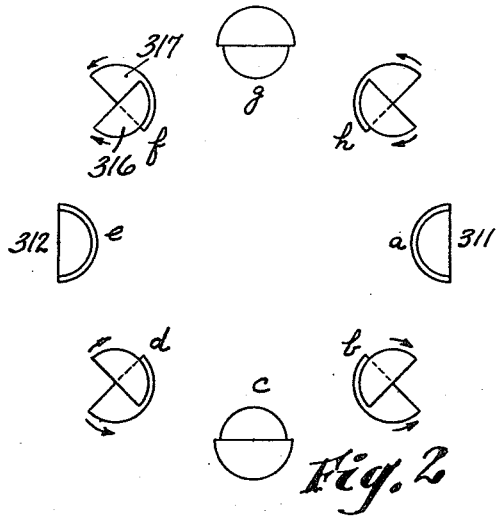
Figure 2 is a schematic view of the action of the oppositely rotating shutters.

The operation of the oppositely rotating shutters is shown diagrammatically in Figure 2. As shown in Figure 2a, the light aperture 311 for the left eye is entirely opened and aperture 312 is entirely closed at a typical beginning of a cycle. Thereafter the aperture 311 is partially closed as discs 316 revolves in a clockwise direction and disc 317 revolves in a counter-clockwise direction. As shown in Figure 2c the aperture 311 is closed completely just prior to the beginning of the observation by the right eye thru the opening of aperture 312 as shown in Figure 2d. Thereafter aperture 312 is fully opened (as shown in Figure 2e) and then partially closed (Figure 2f) and then entirely closed (Figure 2g). Thereafter the aperture 311 is slightly opened and then partially opened (Figure 2h) and then fully opened, as shown in Figure 2a and the cycle repeats itself. As shown in Figure 2, the oppositely rotating discs provide two very large area light apertures which are opened alternately by the oppositely rotating shutter with a substantially zero dual opacity and a substantially zero dual transparency. Moreover, the area of the light apertures 311 and 312 is substantially that of the entire shutter mechanism whereby a minimized restriction of the field of vision is achieved. In Figure 2 the rear disc 317 is shown for diagrammatical representation much larger than forward disc 316, but as shown in Figures 1 and 3, the oppositely rotating shutter would normally have discs of the same size, the diameter differences being principally for diagrammatic purposes.

Figure 4:
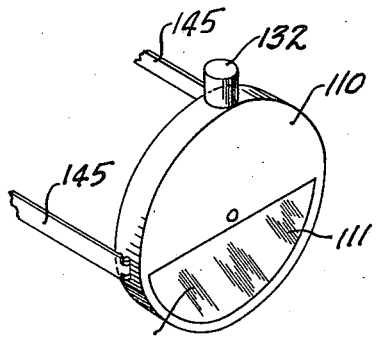
Figure 4 is a perspective view of a modification of the invention.
Figure 5:
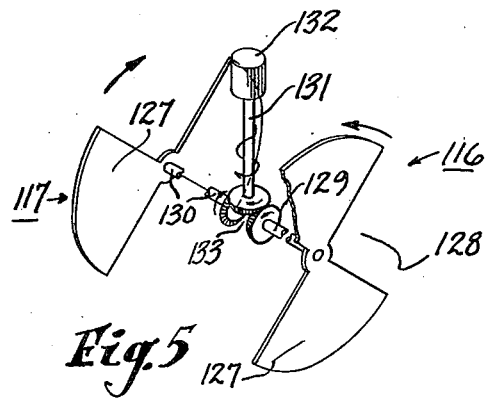
Figure 5 is an exploded view of the internal moving parts of the modification of Figure 4.

As shown in Figures 4 and 5, apertures 111 and 112 are each quadrants in the lower half of the housing 110. The discs 116 and 117 may include opaque sections 127 constituting diametrically opposite quadrants between transparent quadrants 128. The discs 116 and 117 may be mounted on axles 129 and 130 which are driven by shaft 131 and the electric motor 132 through gears 133.

A stereoscopic apparatus is shown in association with dual picture apparatus in Figure 6. Two movie cameras 239 and 240 are positioned adjacent to each other with light tubes 241 and 242 extending parallel from the cameras to coincide with windows 211 and 212 of a housing 210. Each light tube has a plurality of lenses. The oppositely rotating discs 216 and 217 each have three 60° opaque segments 227 alternately positioned with three 60° transparent segments 228 and are shown in a position analogous to Figure 2a with window 211 open. The axle 230 driving the disc 217 concentrically encloses the axle 229 driving the forward disc 216. Both the motor 219 and the motor 220 for driving the discs 216 and 217 respectively are positioned on the housing 210 and between the picture devices 239 and 240. The stereoscopic apparatus of the present invention can be employed in cooperation with two projectors or other picture apparatus having dual light tubes which need to be effectively alternately obscured, and dual cameras are referred to merely for illustrative purposes. The stereoscopic apparatus is desirably an integral part of the dual picture device instead of an attachment.

The specific embodiments shown in the drawings and/or described are merely illustrative examples of the invention, and are not restrictive of the invention which is defined in the claims.

The invention claimed is:

Stereoscopic apparatus for aiding a spectator to gain a three dimensional effect while viewing a stereoscopic moving picture, said apparatus comprising a housing having transparent circular front and rear faces and a transparent partition therebetween, the center of said circular front being in the bisecting plane between the eyes of the spectator; a plastic disc having semi-circular transparent and semi-circular opaque sections, said disc being positioned between the partition and front face; an electric motor rotatably adjustably mounted at the center of the front face of the housing and rotating said disc; a second electric motor rotatably adjustably mounted at the center of the rear face of the housing and rotating a similar second disc positioned between the partition and the rear face, the rotations of said two discs being in opposite directions at the same predetermined speed, whereby diametrically opposed semicircular light apertuers are opened alternately, there being a division line between such light apertures, and whereby an aperture is obscured substantially completely during the partial, complete, and partial opening of the opposite light aperture, said rotatable mountings of the motors being adjustable to bring the division line between the two light apertures into the bisecting plane between the eyes of the spectator; a headpiece adjustably fitting snugly against the front and rear of the head of the spectator; and means connecting the housing and headpiece whereby the housing is positioned close to but just in front of the eyes of the spectator.

References Cited in the file of this patent

UNITED STATES PATENTS

| | | |
|---|---|---|
| 1,714,849 | Daponte | May 28, 1929 |
| 2,273,512 | Caldwell et al. | Feb. 17, 1942 |
| 2,467,059 | Terce | Apr. 12, 1949 |

FOREIGN PATENTS

| | | |
|---|---|---|
| 310,527 | Great Britain | Oct. 17, 1930 |
| 336,460 | France | Jan. 16, 1904 |
| 388,157 | France | Aug. 4, 1908 |
| 935,355 | France | Feb. 2, 1948 |
| 746,794 | Germany | Aug. 25, 1944 |